United States Patent
Takesue et al.

(10) Patent No.: US 6,942,582 B2
(45) Date of Patent: *Sep. 13, 2005

(54) GOLF BALL

(75) Inventors: Rinya Takesue, Chichibu (JP); Hiroyuki Nagasawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/668,314

(22) Filed: Sep. 24, 2003

(65) Prior Publication Data

US 2004/0063518 A1 Apr. 1, 2004

(30) Foreign Application Priority Data

Sep. 26, 2002 (JP) ........................................ 2002-281710

(51) Int. Cl.$^7$ .............................................. A63B 37/12
(52) U.S. Cl. ...................................................... 473/378
(58) Field of Search .................................. 473/378, 351

(56) References Cited

U.S. PATENT DOCUMENTS

| | | | |
|---|---|---|---|
| 5,559,188 A | * | 9/1996 | Egashira et al. ............... 525/74 |
| 5,872,185 A | | 2/1999 | Ichikawa et al. |
| 6,143,826 A | * | 11/2000 | Ohnaga et al. ................ 525/93 |
| 6,786,840 B2 | * | 9/2004 | Hayashi et al. .............. 473/377 |
| 2003/0191243 A1 | * | 10/2003 | Hamada et al. ................ 525/94 |
| 2004/0106470 A1 | * | 6/2004 | Hayashi et al. .............. 473/371 |

* cited by examiner

*Primary Examiner*—Raeann Gorden
(74) *Attorney, Agent, or Firm*—Sughrue Mion, PLLC

(57) ABSTRACT

In a golf ball comprising a core and a cover, at least one layer of the cover is composed mainly of a mixture of an amino-terminated block polymer and an ionomer resin in a weight ratio between 3/97 and 60/40. The mixture is effectively moldable, and the golf ball is improved in rebound, durability, and scuff resistance.

7 Claims, No Drawings

GOLF BALL

FIELD OF THE INVENTION

This invention relates to golf balls having improved rebound, durability and scuff resistance as well as ease of molding.

BACKGROUND ART

In the golf ball art, ionomer resins which are metal ion-neutralized ethylene-(meth)acrylic acid copolymers have been widely used as the resin component in the cover outermost layer of solid golf balls and certain wound golf balls, because of their hitting durability and cut resistance. However, the ionomer resins have a higher hardness than the balata rubber conventionally used as the cover material. Thus golf balls using ionomer resins as the cover material are hard in hitting feel and inferior in spin control on iron shots, as compared with balata cover golf balls.

To overcome these problems, Egashira et al., U.S. Pat. No. 5,559,188 proposed the blending of a thermoplastic elastomer having a crystalline polyethylene block with an ionomer resin for rendering the ionomer resin flexible. According to this patent wherein a cover outermost layer is formed of a composition comprising an ionomer resin and a specific amount of a thermoplastic elastomer having a crystalline polyethylene block, the golf ball has a soft pleasant hitting feel, a minimized decline of repulsion or rebound, and resistance to scuffing upon iron shots.

However, simple blending of the ionomer resin with the thermoplastic elastomer often suffers from incompatibility therebetween. If a composition which has not been fully homogenized is used and molded into the cover outermost layer, there is a possibility that the layer be fluffed and ridged during grinding after molding, or the golf ball be reduced in rebound. It is described that the addition of a carboxyl or epoxy-modified olefin polymer as a third component is effective for improving the compatibility. The addition of such a third component, however, is impractical because the fluidity of the resin composition can be remarkably reduced to interfere with injection molding.

Ichikawa et al., U.S. Pat. No. 5,872,185 discloses to use a blend of an ionomer resin with a thermoplastic elastomer having a crystalline polyethylene block as an intermediate layer of a three-piece golf ball for improving the rebound and impact durability. Analogous problems can arise in this case too. When simple blends of the ionomer resin with the thermoplastic elastomer are employed in the intermediate layer, there is left a room for further improvement in the rebound of the golf ball.

SUMMARY OF THE INVENTION

An object of the invention is to provide a golf ball having improved hitting durability, scuff resistance and rebound as well as ease of molding.

The invention relates to a golf ball comprising a core and a cover of one or more layers. It has been found that when a cover layer is composed mainly of a mixture of an amino-terminated block polymer and an ionomer resin, the golf ball is significantly improved in rebound, durability, scuff resistance and moldability.

Accordingly, the invention provides a golf ball comprising a core and a cover enclosing the core, the cover comprising at least one layer composed mainly of a mixture of an amino-terminated block polymer and an ionomer resin in a weight ratio between 3/97 and 60/40.

In one embodiment, the cover includes an outermost layer composed mainly of the mixture.

In another embodiment, the cover consists of a plurality of layers, at least one layer of which other than an outermost layer is composed mainly of the mixture.

DESCRIPTION OF THE PREFERRED EMBODIMENTS

The invention relates to a golf ball comprising a core and a cover of one or more layers enclosing the core. At least one layer of the cover is composed mainly of a mixture of (A) an amino-terminated block polymer and (B) an ionomer resin in a weight ratio between 3/97 and 60/40. The mixture is sometimes referred to as "inventive cover stock," hereinafter.

When the ionomer resin (B) is blended with a specific proportion of a specific resin component in the form of an amino-terminated block polymer, both the components are fully compatible or miscible. The resulting mixture is a homogeneous ionomer resin mixture which is more flexible. When this mixture is used as a cover material, the golf ball is improved in hitting feel, controllability, rebound, durability, and scuff resistance. Additionally, the mixture is effectively moldable.

The amino-terminated block polymer (A) is preferably a block copolymer having a crystalline olefin block, which is end-modified with an amino group.

The block copolymers having crystalline olefin blocks are preferably those block copolymers having a crystalline olefin block (C) or a crystalline olefin block (C) and a crystalline styrene block (S) as a hard segment and a relatively random copolymer (EB) structure consisting of ethylene and butylene as a soft segment. More preferred are block copolymers of a molecular structure having the hard segment at one end or both ends thereof, typically C-EB, C-EB-C, and S-EB-C structures. The crystalline olefin blocks include crystalline polyethylene blocks and crystalline polypropylene blocks, with the crystalline polyethylene blocks being preferred.

The block copolymers having crystalline olefin blocks are obtainable by hydrogenating polybutadiene and styrene-butadiene copolymers. The polybutadiene and styrene-butadiene copolymers to be hydrogenated are preferably butadiene polymers having 1,4-polymerized blocks with a 1,4-bond content of at least 95% by weight and containing at least 50% by weight, especially at least 80% by weight of 1,4-bond based on the entire weight of butadiene structure. In particular, block copolymers of the C-EB-C structure are preferably obtained by hydrogenating polybutadiene wherein both ends of its molecular chain are 1,4-polymers rich in 1,4-bond and an intermediate portion is a mixture of 1,4-bond and 1,2-bond.

When the block copolymer having a crystalline olefin block is end-modified with an amino group, desirably the end of the styrene block is modified with an amino group.

The percent hydrogenation of hydrogenated products of polybutadiene and styrene-butadiene copolymers (that is, percent conversion of double bonds in polybutadiene and styrene-butadiene copolymers into saturated bonds) is preferably 60 to 100%, more preferably 90 to 100%. With a percent hydrogenation of less than 60%, gelation and deterioration may occur in blending the block copolymer with an ionomer resin and problems may arise with respect to the weather resistance and hitting durability of the resulting cover layer of a golf ball.

Preferably the block copolymers having crystalline olefin blocks contain about 10 to 50% by weight of the hard segment. Block copolymers containing more than 50% by weight of the hard segment may be less flexible, failing to achieve the objects of the invention. With less than 10% by weight of the hard segment, a blend may be less moldable.

The block copolymers having crystalline olefin blocks preferably have a number average molecular weight of about 30,000 to 800,000.

The block copolymers having crystalline olefin blocks should preferably have a melt index of 0.5 to 15 g/10 min. at 230° C., more preferably 1 to 7 g/10 min. at 230° C. Outside the range, defects including weld lines, sink marks and short shots can occur upon injection molding.

The ionomer resin (B) used herein may be any ionomer resins conventionally employed as the cover stock for golf balls. Preferred are ionomer resins containing (b-1) an olefin/unsaturated carboxylic acid random bipolymer and/or a metal ion neutralization product of an olefin/unsaturated carboxylic acid random bipolymer and (b-2) an olefin/unsaturated carboxylic acid/unsaturated carboxylic acid ester random terpolymer and/or a metal ion neutralization product of an olefin/unsaturated carboxylic acid/unsaturated carboxylic acid ester random terpolymer The olefin in component (b-1) or (b-2) is preferably an α-olefin. Specific examples of suitable α-olefins include ethylene, propylene and 1-butene. Of these, ethylene is especially preferred. These olefins may also be used in combinations of two or more thereof.

The unsaturated carboxylic acid in component (b-1) or (b-2) is preferably an α, β-unsaturated carboxylic acid having 3 to 8 carbon atoms. Specific examples of α, β-unsaturated carboxylic acid having 3 to 8 carbon atoms include acrylic acid, methacrylic acid, ethacrylic acid, itaconic acid, maleic acid and fumaric acid. Of these, acrylic acid and methacrylic acid are preferred. These unsaturated carboxylic acids may also be used in combinations of two or more thereof.

The unsaturated carboxylic acid ester in component (b-2) is preferably, but not necessarily, a lower alkyl ester of the above-described unsaturated carboxylic acid. Typical examples are those esters obtained by reacting the above-described unsaturated carboxylic acids with lower alcohols such as methanol, ethanol, propanol, n-butanol and isobutanol. Acrylic esters and methacrylic esters are especially preferred. Specific examples of the unsaturated carboxylic acid ester in (b-2) include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, i-butyl acrylate) is especially preferred. These unsaturated carboxylic acid esters may be used in combinations of two or more thereof.

During preparation of the olefin/unsaturated carboxylic acid copolymer or olefin/unsaturated carboxylic acid/unsaturated carboxylic acid ester copolymer, any additional monomer may be copolymerized insofar as the objects of the invention are attainable.

The copolymers preferably have an unsaturated carboxylic acid content of 5 to 20% by weight in the case of (b-1) and 1 to 10% by weight in the case of (b-2). Too low an unsaturated carboxylic acid content may result in a low rigidity and resilience, diminishing the flight performance of the golf ball. On the other hand, too high an unsaturated carboxylic acid content may result in an inadequate flexibility.

Also, the copolymers (b-2) preferably have an unsaturated carboxylic acid ester content of 12 to 45% by weight. Too low an unsaturated carboxylic acid ester content may fail to achieve the flexible effect whereas too high an unsaturated carboxylic acid ester content may result in a resilience decline.

When components (b-1) and (b-2) are used in blend, they are preferably blended in a weight ratio (b-1)/(b-2) between 100/0 and 25/75, more preferably between 100/0 and 50/50. Too high a proportion of component (b-2) may result in an inadequate resilience.

The ionomer resin (B) used in the practice of the invention is preferably one obtained by neutralizing the above-described copolymer with at least one type of metal ion having a valence of 1 to 3. Examples of mono- to tri-valent metal ions that are suitable for neutralization include sodium, potassium, lithium, magnesium, calcium, zinc, aluminum, ferrous ions and ferric ions.

Such metal ions may be introduced, for example, by reacting the above-described copolymers with a hydroxide, methoxide, ethoxide, carbonate, nitrate, formate, acetate or oxide of the aforementioned mono- to tri-valent metals.

The carboxylic acid included within the copolymer is generally neutralized with metal ions such that at least 10 mol %, and preferably at least 30 mol %, but not more than 100 mol %, and preferably not more than 90 mol %, of the carboxyl groups on the copolymer are neutralized. A low degree of neutralization may result in low resilience.

In a certain embodiment, blending a monovalent metal ionomer with a divalent metal ionomer is advantageous for improving resilience. Preferably they are blended in a weight ratio between 20/80 and 80/20.

It is well-known that a good balance between resilience and durability can be achieved in a layer composed primarily of ionomer resin by blending suitable amounts of ionomer resins containing different monovalent, divalent or trivalent metal ionic species. Such blending is preferred in the practice of the invention.

In the practice of the invention, commercial products may be used as the ionomer resin (B). Typical products are Surlyn by E.I. Dupont and Himilan by Dupont-Mitsui Polychemicals Co., Ltd.

In the mixture of the amino-terminated block polymer (A) and the ionomer resin (B) according to the invention, they are mixed such that component (A) is present in an amount of 3 to 60 parts by weight, preferably 10 to 60 parts by weight, and more preferably 20 to 45 parts by weight, and component (B) is present in an amount of 97 to 40 parts by weight, preferably 90 to 40 parts by weight, and more preferably 80 to 55 parts by weight, provided that the total is 100 parts by weight. Too small amounts of component (A) are insufficient to soften the ionomer resin, leading to insufficient improvements in hitting feel and controllability. On the other hand, too large amounts of component (A) detract from cut resistance.

According to the invention, at least one layer of the cover is formed mainly of a mixture of the amino-terminated block polymer (A) and the ionomer resin (B) in the above-specified ratio although various additives may be added to the mixture if desired and insofar as this does not compromise the objects of the invention. Suitable additives include pigments, dispersants, antioxidants, UV absorbers, photostabilizers, and inorganic fillers, for example, zinc oxide, barium sulfate, titanium dioxide, magnesium oxide, magnesium hydroxide, magnesium carbonate, sodium hydroxide, sodium carbonate, calcium oxide, calcium hydroxide, lithium hydroxide, lithium carbonate, and magnesium stearate. The additives are generally blended in amounts of 0.1 to 50 parts by weight, preferably 0.5 to 30 parts by weight, more preferably 1 to 6 parts by weight per 100 parts by weight of the mixture of components (A) and (B). Too large amounts of additives may adversely affect durability whereas too small amounts of additives may fail to achieve the addition effects.

The inventive cover stock (or mixture) usually has a Shore D hardness of at least 40, preferably at least 45, and the upper limit is usually up to 62, preferably up to 58. Too low a Shore D hardness may lead to poor resilience whereas too high a Shore D hardness may offset improvements in feel and controllability.

The inventive cover stock usually has a specific gravity of 0.85 to 1.2 g/cm$^3$, preferably 0.9 to 1.1 g/cm$^3$, more preferably 0.92 to 1.0 g/cm$^3$.

It is not critical how to prepare the inventive cover stock. For example, the inventive cover stock is prepared by kneading the necessary components in a suitable mixer, typically an internal mixer such as a kneading-type twin-screw extruder, Banbury mixer and kneader while heating at a temperature of 150 to 250° C.

When it is desired to add various additives to the inventive cover stock in addition to components (A) and (B), the blending method is not particularly limited. For example, the additives may be blended along with components (A) and (B), followed by simultaneous heating and mixing. Alternatively, components (A) and (B) are previously heated and mixed, additives added to the premix, and the overall composition subjected to additional heating and mixing.

The core used herein may be either a solid core or a wound core and may be produced by a conventional method. For example, a solid core may be produced by preparing a rubber composition composed of 100 parts by weight of cis-1,4-polybutadiene; from 10 to 60 parts by weight of one or more vulcanizing or crosslinking agents selected from among α, β-monoethylenically unsaturated carboxylic acids (e.g., acrylic acid, methacrylic acid) or metal ion-neutralized products thereof and functional monomers (e.g., trimethylolpropane methacrylate); from 5 to 30 parts by weight of a filler such as zinc oxide or barium sulfate; from 0.5 to 5 parts by weight of a peroxide such as dicumyl peroxide; and, if necessary, from 0.1 to 1 part by weight of an antioxidant. The resulting rubber composition can be formed into a solid spherical core by press vulcanization to effect crosslinkage, followed by compression under heating at 140 to 170° C. for a period of 10 to 40 minutes.

The wound core of a thread-wound golf ball may be produced using either a liquid or a solid center. In the case of a liquid center, a hollow spherical center envelope may be formed from the above-described rubber composition, for example, and a liquid filled into this envelope by a well-known method. If a solid center is used instead, the solid center may be produced by the solid core production method described above. Thereafter, rubber thread is wound in a stretched state about the center to form the core.

Use may be made of rubber thread produced by a conventional method. For example, rubber thread is produced by compounding natural rubber or synthetic rubber such as polyisoprene with various additives (e.g., antioxidants, vulcanization accelerators and sulfur) to form a rubber composition, extruding and vulcanizing the composition.

The core used herein may consist of either a single layer or a plurality of layers.

The core usually has a surface hardness of 60 to 85, preferably 65 to 83, more preferably 67 to 80 on JIS C hardness scale. Too high a core surface hardness may provide a harder feel or too much spin on W#1 shots. Too low a core surface hardness may lead to a softer feel or too low resilience to travel a distance or adversely affect durability against cracking upon repeated impact.

Usually, the core has a diameter of at least 25 mm, preferably at least 36 mm and the upper limit is usually up to 40 mm, preferably up to 39 mm, more preferably up to 38 mm.

The golf ball of the invention is constructed by enclosing the above-described core with a cover including at least one layer formed of the inventive cover stock. The golf ball of the invention may be any of wound golf balls and two-, three- and multi-piece solid golf balls. The cover layer formed of the inventive cover stock may constitute a portion or the entirety of the cover. Differently stated, the cover may be either a single layer or a multilayer structure of two or more layers, provided that the single layer or at least one layer of the multilayer structure is formed of the inventive cover stock.

Consequently, the golf ball of the invention may be manufactured by preparing a heated mixture of components (A) and (B) and optional components as the inventive cover stock for a single cover layer or at least one layer of a multilayer cover, and molding the cover stock by any well-known method.

The cover may be formed by any well-known methods. In one such method, a core prefabricated according to the type of ball to be manufactured is placed in a mold, and the inventive cover stock is heated, mixed and melted, then injection-molded over the core. In this case, the golf ball manufacturing operation can be carried out under such conditions that the cover stock maintain excellent flow characteristics and moldability. The resulting golf ball has a high rebound. In an alternative method, first a pair of hemispherical cups are molded from the inventive cover stock, following which the cups are placed over a core and molded under heat (120 to 170° C.) and pressure for 1 to 5 minutes.

In order to acquire a fluidity for injection molding and to improve molding efficiency, the inventive cover stock should preferably be adjusted to an appropriate melt flow rate. It is recommended that the inventive cover stock have a melt flow rate (MFR) as measured according to JIS K6760 at a test temperature of 190° C. and a test load of 21.18 N (2.16 kgf), of usually at least 0.5 dg/min, preferably at least 1 dg/min, more preferably at least 1.5 dg/min, even more preferably at least 2 dg/min, and the upper limit of MFR be usually up to 20 dg/min, preferably up to 10 dg/min, more preferably up to 5 dg/min, even more preferably up to 3 dg/min. Too high or too low a MFR may lead to a substantial loss of processability.

The cover formed of the inventive cover stock generally has a thickness of at least 0.5 mm, preferably at least 0.9 mm, more preferably at least 1.1 mm, and the upper limit of thickness is generally up to 3 mm, preferably up to 2.5 mm, more preferably up to 2.0 mm. Too much a cover thickness may detract from rebound whereas a cover with too small a thickness may be less durable.

In the golf ball of the invention, the surface of the outermost layer of the cover may have a plurality of dimples formed thereon. The cover may be administered various treatment such as surface preparation, stamping and painting. In particular, the ease of work involved in administering such surface treatment to a golf ball cover made of the inventive cover stock can be improved by the good processability of the cover surface.

The "dimple volume occupancy," abbreviated below as VR and expressed in units of percent, is defined as the ratio of the total volume of dimples on the golf ball surface to the volume of a hypothetical golf ball without dimples. For shots taken with a driver (W#1), it is desirable for the golf ball of the invention to have a VR value of at least 0.66, preferably at least 0.70, and most preferably at least 0.75, but not more than 0.85, preferably not more than 0.82, and most preferably not more than 0.79. At too low a VR value, the ball tends to follow a skying arc and does not roll well on landing, resulting in a short total distance. On the other hand, at too high a VR value, the ball tends to have a less rising trajectory and thus a poor carry, resulting in a short total distance.

The golf ball of the invention may be manufactured for use in tournaments by giving it a diameter and weight which conform with the Rules of Golf (USGA). That is, the ball may be produced to a diameter of not less than 42.67 mm and a weight of not greater than 45.93 g. The golf ball is also manufactured to an initial velocity of generally at least 76.4 m/s, preferably at least 76.6 m/s, more preferably at least 76.8 m/s, with the upper limit being up to 77.7 m/s. Too low an initial velocity may result in a short flight distance whereas too high an initial velocity causes the golf ball to fall outside the specifications set by the Rules of Golf.

EXAMPLE

Examples of the invention and comparative examples are given below by way of illustration and not by way of limitation.

Examples 1–3 & Comparative Examples 1–8

Using a core material based on cis-1,4-polybutadiene, a solid core was produced having a diameter of 38.6 mm, a weight of 35.1 g and a deflection of 2.8 mm under an applied load of 100 kg.

Cover materials in pellet form were prepared by mixing ingredients in accordance with the composition shown in Table, 1 at 200° C. on a kneading-type twin-screw extruder, extruding and pelletizing. In each of the examples, the cover material was injected into a mold in which the solid core had been placed, giving a two-piece solid golf ball having a diameter of 42.8 mm and a cover gage of 2.1 mm.

The following characteristics were measured or evaluated for the golf balls obtained in each of the above examples. The results are shown in Table 1.

Trade names mentioned in Table 1 have the following meanings.

Himilan 1706: Zinc ion-neutralized ethylene-methacrylic acid copolymer ionomer by Dupont-Mitsui Polychemicals Co., Ltd.

Himilan 1605: Sodium ion-neutralized ethylene-methacrylic acid copolymer ionomer by Dupont-Mitsui Polychemicals Co., Ltd.

Himilan 1557: Zinc ion-neutralized ethylene-methacrylic acid copolymer ionomer by Dupont-Mitsui Polychemicals Co., Ltd.

Himilan 1856: Sodium ion-neutralized ethylene-methacrylic acid-acrylate terpolymer by Dupont-Mitsui Polychemicals Co., Ltd.

Surlyn 8120: Sodium ion-neutralized ethylene-methacrylic acid-acrylate ternary copolymer by E.I. DuPont de Nemours and Company.

HSB 1561: amino-terminated block polymer, i.e., hydrogenated S-EB-C tri-block polymer whose styrene block is end-modified with an amino group, by JSR Co., Ltd.

Dynaron 6100P: C-EB-C block copolymer having crystalline olefin block, by JSR Co., Ltd.

Dynaron 4600P: S-EB-C block copolymer having crystalline olefin block, by JSR Co., Ltd.

Bondfast 2C: ethylene-glycidyl methacrylate copolymer, GMA content 6 wt %, Shore D hardness 46, by Sumitomo Chemical Co., Ltd.

Cover Resin Hardness:
Shore D hardness according to ASTM D-2240

Ball Hardness:
Measured as the deflection (in millimeters) of the ball under an applied load of 100 kg.

Initial Velocity:
Measured using the same type of initial velocity instrument as approved by the United States Golf Association (USGA), and in accordance with USGA rules.

Scuff Resistance:
After the ball was conditioned at 23° C., it was hit by means of a swing robot machine equipped with a pitching

TABLE 1

|  |  | Example | | | Comparative Example | | | | | | | |
|---|---|---|---|---|---|---|---|---|---|---|---|---|
|  |  | 1 | 2 | 3 | 1 | 2 | 3 | 4 | 5 | 6 | 7 | 8 |
| Cover | Himilan 1706 | 45 | 37.5 | 30 | 44 | 35 | 25 | 35 | 35 | 50 | 25 | |
| Composition | Himilan 1605 | 45 | 37.5 | 30 | 44 | 35 | 25 | 35 | 35 | 50 | 25 | |
| (pbw) | Himilan 1557 | | | | | | | | | | | 25 |
|  | Himilan 1856 | | | | | | | | | | | 25 |
|  | Surlyn 8120 | | | | | | | | | | 50 | 50 |
|  | HSB 1561 | 10 | 25 | 40 | | | | | | | | |
|  | Dynaron 6100P | | | | 12 | 30 | 50 | | 20 | | | |
|  | Dynaron 4600P | | | | | | | 30 | | | | |
|  | Bondfast 2C | | | | | | | | 10 | | | |
|  | Magnesium stearate | 0.5 | 0.5 | 0.5 | 0.5 | 0.5 | 0.5 | 0.5 | 0.5 | 0.5 | 0.5 | 0.5 |
|  | Titanium dioxide | 3 | 3 | 3 | 3 | 3 | 3 | 3 | 3 | 3 | 3 | 3 |
|  | Cover resin hardness | 60 | 56 | 50 | 60 | 56 | 50 | 53 | 56 | 64 | 54 | 51 |
| Ball properties | Weight (g) | 45.3 | 45.2 | 45.2 | 45.3 | 45.2 | 45.2 | 45.3 | 45.2 | 45.4 | 45.2 | 45.2 |
|  | Hardness (mm) | 2.42 | 2.52 | 2.62 | 2.42 | 2.52 | 2.62 | 2.57 | 2.52 | 2.35 | 2.55 | 2.66 |
|  | Initial velocity (m/s) | 77.7 | 77.5 | 77.3 | 77.6 | 77.4 | 77.2 | 77.4 | 77.3 | 77.7 | 76.7 | 76.5 |
|  | Scuff resistance | 5 | 5 | 5 | 5 | 5 | 5 | 5 | 5 | 4 | 2 | 2 |
|  | Injection moldability | ○ | ○ | ○ | ○ | ○ | ○ | ○ | X | ○ | ○ | ○ |
|  | Impact durability | ○ | ○ | ○ | X | X | ○ | ○ | X | X | X | ○ |
|  | Molding/grinding adaptability | ○ | ○ | ○ | X | X | X | X | ○ | ○ | ○ | ○ | wedge at a head speed of 37 m/s. Hitting was repeated at three random points per ball. The three impact areas on the ball surface were observed and rated according to the following criterion.

| Point | Remarks |
|---|---|
| 5 | no change or slight club face marks |
| 4 | noticeable club face marks, but no fluff |
| 3 | surface fluffed, chafed, ridged |
| 2 | surface fluffed and cracked |
| 1 | dimple lands scraped off |

Cover materials in pellet form were prepared by mixing ingredients in accordance with the composition shown in Table 2 at 200° C. on a kneading-type twin-screw extruder, extruding and pelletizing. In each example, an intermediate layer material was injection molded over the solid core to form a cover inner layer having a gage of 1.7 mm. An outer layer material was then injection molded thereon to form a cover outer layer, thereby completing a three-piece solid golf ball having a diameter of 42.8 mm.

The following characteristics were measured or evaluated for the golf balls obtained in each of the above examples. The results are shown in Table 2.

TABLE 2

| | | Example | | | Comparative Example | | | | | |
|---|---|---|---|---|---|---|---|---|---|---|
| | | 4 | 5 | 6 | 9 | 10 | 11 | 12 | 13 | 14 |
| Cover inner layer composition (pbw) | Surlyn 8945 | 45 | 37.5 | 30 | 25 | 35 | 44 | 35 | 25 | 35 |
| | Surlyn 9945 | 45 | 37.5 | 30 | 25 | 35 | 44 | 35 | 25 | 35 |
| | Surlyn 8320 | | | | | | | | 25 | 15 |
| | Surlyn 9320 | | | | | | | | 25 | 15 |
| | Dynaron 6100P | | | | 50 | 30 | 12 | | | |
| | Dynaron 4600P | | | | | | | 30 | | |
| | HSB 1561 | 10 | 25 | 40 | | | | | | |
| | Magnesium stearate | 0.5 | 0.5 | 0.5 | 0.5 | 0.5 | 0.5 | 0.5 | 0.5 | 0.5 |
| Cover inner layer resin hardness | | 60 | 56 | 50 | 50 | 56 | 60 | 53 | 50 | 56 |
| Cover outer layer composition (pbw) | Himilan 1557 | 50 | 50 | 50 | 50 | 50 | 50 | 50 | 50 | 50 |
| | Himilan 1601 | 50 | 50 | 50 | 50 | 50 | 50 | 50 | 50 | 50 |
| Cover outer layer resin hardness | | 59 | 59 | 59 | 59 | 59 | 59 | 59 | 59 | 59 |
| Ball properties | Weight (g) | 45.3 | 45.3 | 45.3 | 45.3 | 45.3 | 45.3 | 45.3 | 45.3 | 45.3 |
| | Hardness (mm) | 2.70 | 3.00 | 3.30 | 3.30 | 3.00 | 2.70 | 3.20 | 3.30 | 3.00 |
| | Initial velocity (m/s) | 77.3 | 77.2 | 77.0 | 76.9 | 77.1 | 77.2 | 77.1 | 76.3 | 76.6 |

Injection Moldability:

After the cover material was injection molded over the core, the cover was visually inspected to evaluate the moldability according to the following criterion.

◯: no weld marks, no sink marks

X: weld marks and sink marks observed

Impact Durability:

The ball was repeatedly struck against a metal plate at an impact speed of 50 m/s and over 100 cycles. The ball was visually inspected for cracks.

◯: not broken

X: broken

Molding/Grinding Adaptability:

After the cover material was injection molded over the core, gate fins were ground off. The surface state of the ground cover was observed.

◯: no skin peeling, no roughening

X: skin peeled and roughened

Examples 4–6 and Comparative Examples 9–14

Using a core material based on cis-1,4-polybutadiene, a solid core was produced having a diameter of 36.4 mm, a weight of 30.9 g, and a deflection of 3.8 mm under an applied load of 100 kg.

Trade names mentioned in Table 2 have the following meanings.

Surlyn 8945: Sodium ion-neutralized ethylene-methacrylic acid copolymer ionomer by E.I. DuPont de Nemours and Company.

Surlyn 9945: Zinc ion-neutralized ethylene-methacrylic acid copolymer ionomer by E.I. DuPont de Nemours and Company.

Surlyn 8320: Sodium ion-neutralized ethylene-methacrylic acid-acrylate terpolymer by E.I. DuPont de Nemours and Company.

Surlyn 9320: Zinc ion-neutralized ethylene-methacrylic acid-acrylate terpolymer by E.I. DuPont de Nemours and Company.

Dynaron 6100P: C-EB-C block copolymer having crystalline olefin block, by JSR Co., Ltd.

Dynaron 4600P: S-EB-C block copolymer having crystalline olefin block, by JSR Co., Ltd.

HSB 1561: amino-terminated block polymer, i.e., hydrogenated S-EB-C tri-block polymer whose styrene block is end-modified with an amino group, by JSR Co., Ltd.

Himilan 1557: Zinc ion-neutralized ethylene-methacrylic acid copolymer ionomer by Dupont-Mitsui Polychemicals Co., Ltd.

Himilan 1601: Sodium ion-neutralized ethylene-methacrylic acid copolymer ionomer by Dupont-Mitsui Polychemicals Co., Ltd.

Cover Inner Layer Resin Hardness:

Shore D hardness according to ASTM D-2240

Cover Outer Layer Resin Hardness:

Shore D hardness according to ASTM D-2240

Ball Hardness:

Measured as the deflection (in millimeters) of the ball under an applied load of 100 kg.

Initial Velocity:

Measured using the same type of initial velocity instrument as approved by the United States Golf Association (USGA), and in accordance with USGA rules.

As is evident from Tables 1 and 2, the golf balls in which mixtures of ionomer resins and amino-modified thermoplastic elastomers having crystalline olefin blocks are used in the outermost layer or at least one layer other than the outermost layer of the cover are drastically improved in rebound, durability, scuff resistance and moldability as compared with the prior art golf balls.

When mixtures of ionomer resins having good flow and molding properties and amino-modified thermoplastic elastomers having crystalline olefin blocks are used in the outermost layer or at least one layer other than the outermost layer of the cover, not only the mixtures are effectively moldable, but also golf balls are drastically improved in rebound, durability, and scuff resistance.

Japanese Patent Application No. 2002-281710 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball comprising a core and a cover enclosing the core, said cover comprising at least one layer composed mainly of a mixture of an amino-terminated block polymer and an ionomer resin in a weight ratio between 3/97 and 60/40.

2. The golf ball of claim 1, wherein said cover includes an outermost layer composed mainly of the mixture.

3. The golf ball of claim 1, wherein said cover comprises a plurality of layers, at least one layer of which other than an outermost layer is composed mainly of the mixture.

4. The golf ball of claim 1, wherein said amino-terminated block polymer is a block copolymer having a crystalline olefin block, which is end-modified with an amino group.

5. The golf ball of the above-described claim 4, wherein said crystalline olefin block includes crystalline polyethylene blocks and crystalline polypropylene blocks.

6. The golf ball of claim 1, wherein said weight ratio of an amino-terminated block polymer and an ionomer resin is between 10/90 and 45/55.

7. The golf ball of claim 1, wherein said ionomer is a blend of a monovalent metal ionomer with a divalent metal ionomer in a weight ratio between 20/80 and 80/20.

* * * * *